United States Patent
Kuranuki

(10) Patent No.: US 12,088,129 B2
(45) Date of Patent: *Sep. 10, 2024

(54) ENERGY TRANSFER CIRCUIT AND POWER STORAGE SYSTEM

(71) Applicant: Panasonic Intellectual Property Management Co., Ltd., Osaka (JP)

(72) Inventor: Masaaki Kuranuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 608 days.

This patent is subject to a terminal disclaimer.

(21) Appl. No.: 17/286,896

(22) PCT Filed: Oct. 17, 2019

(86) PCT No.: PCT/JP2019/040824
§ 371 (c)(1),
(2) Date: Apr. 20, 2021

(87) PCT Pub. No.: WO2020/090486
PCT Pub. Date: May 7, 2020

(65) Prior Publication Data
US 2021/0351598 A1 Nov. 11, 2021

(30) Foreign Application Priority Data
Nov. 2, 2018 (JP) ................................. 2018-207184

(51) Int. Cl.
*H02J 7/00* (2006.01)
*H01M 10/48* (2006.01)

(52) U.S. Cl.
CPC ........... *H02J 7/0019* (2013.01); *H01M 10/48* (2013.01); *H02J 7/0016* (2013.01); *H02J 7/007182* (2020.01)

(58) Field of Classification Search
CPC ..................................................... H02J 7/0019
(Continued)

(56) References Cited

U.S. PATENT DOCUMENTS

| 11,740,677 B2 * | 8/2023 | Thompson | ........... G01R 31/371 320/127 |
| 2021/0305816 A1 * | 9/2021 | Kuranuki | ............ H01M 10/482 |

(Continued)

FOREIGN PATENT DOCUMENTS

JP 7-322516 12/1995

OTHER PUBLICATIONS

International Search Report of PCT application No. PCT/JP2019/040824 dated Nov. 19, 2019.

*Primary Examiner* — Yalkew Fantu
(74) *Attorney, Agent, or Firm* — Rimon P.C.

(57) ABSTRACT

Controller transitions from a first state of controlling first wiring side switch and second wiring side switch connected to nodes on both sides of discharge cell to be discharged of n cells to be in on state and clamp switch to be in off state to a second state of controlling first wiring side switch and second wiring side switch connected to the nodes on the both sides of discharge cell to be in off state and clamp switch to be in on state. Controller inserts a dead time between the first state and the second state, the dead time being for controlling first wiring side switch and second wiring side switch connected to the nodes on both sides of discharge cell to be in off state and clamp switch to in off state.

15 Claims, 11 Drawing Sheets

(58) Field of Classification Search
USPC .......................................................... 320/127
See application file for complete search history.

(56) References Cited

U.S. PATENT DOCUMENTS

| | | | |
|---|---|---|---|
| 2021/0313813 A1* | 10/2021 | Kuranuki | B60L 58/22 |
| 2022/0216703 A1* | 7/2022 | Kuranuki | H01M 10/48 |
| 2023/0246556 A1* | 8/2023 | Gu | H02M 1/342 |
| | | | 363/17 |

* cited by examiner (a)

(b)

(c)

(a)

(b)

(a)

(c)

(b)

(d)

(a)

(c)

(b)

(d)

(a)

(c)

(b)

ENERGY TRANSFER CIRCUIT AND POWER STORAGE SYSTEM

CROSS-REFERENCE TO RELATED APPLICATIONS

This application is a U.S. national stage application of the PCT International Application No. PCT/JP2019/040824 filed on Oct. 17, 2019, which claims the benefit of foreign priority of Japanese patent application No. 2018-207184 filed on Nov. 2, 2018, the contents all of which are incorporated herein by reference.

TECHNICAL FIELD

The present invention relates to an energy transfer circuit that transfers energy between a plurality of cells or modules connected in series, and a power storage system.

BACKGROUND ART

In these years, secondary batteries such as lithium-ion batteries and nickel-hydrogen batteries are used for various purposes. The secondary batteries are used for, for example, in-vehicle (including electric bicycles) applications for the purpose of supplying power to motors for traveling of an electric vehicle (EV), a hybrid electric vehicle (HEV), and a plug-in hybrid vehicle (PHV), power storage applications for the purpose of peak shifts or backups, and a frequency regulation (FR) applications for the purpose of stabilizing the frequencies of systems.

In a secondary battery such as a lithium ion battery, in general, an equalization process for equalizing the capacities between a plurality of cells connected in series is performed from the viewpoint of maintaining power efficiency and ensuring safety. The equalization process includes a passive method and an active method. In the passive method, a discharge resistance is connected with each of a plurality of cells connected in series, and with respect to a cell having the lowest voltage, the other cells are discharged to match the voltages with the lowest voltage so as to equalize the capacities between the plurality of cells. The active method is a method in which the capacities between a plurality of cells connected in series are equalized by transferring energy between the plurality of cells. The active method is smaller in power loss and is capable of reducing the heat generation amount. However, at present, the passive method with a simple circuit configuration and a low cost is mainly used.

In these years, in particular in the in-vehicle applications, the energy capacities and the outputs of battery packs are increasing. That is, the capacity of each cell in a battery pack and a number of cells connected in series are increasing. In accordance with such situations, the amount of energy that is imbalanced between the plurality of cells is increasing. Therefore, due to the equalization process, the time needed for eliminating the imbalance between the plurality of cells also increases.

On the other hand, in particular in the in-vehicle applications, there is a demand for a reduction in the time needed for the equalization process. In order to eliminate a large energy imbalance for a short period, it is necessary to supply a large current for equalization. In the passive method, the energy imbalance is eliminated by consuming the capacity of a cell having a high voltage with a resistance. Hence, as the current flowing through the resistance increases, the heat generation amount also increases. As described above, as the number of cells connected in series increases, it becomes difficult to ensure a heat dissipation area against heat generation of the resistance on a substrate.

Therefore, there is an increasing demand for the active method in which energy is transferred to a cell having a small capacity, instead of converting energy into heat to be consumed. As a configuration of an equalization circuit in the active method, there is a configuration in which an inductor is connected between the midpoint of two cells and the midpoint of two switches connected in parallel to the two cells (see, for example, PTL 1).

CITATION LIST

Patent Literature

PTL 1: Unexamined Japanese Patent Publication No. 1107-322516

SUMMARY OF THE INVENTION

The above circuit configuration is a circuit for energy transfer between two adjacent cells. However, in a case where three or more cells are connected in series and energy can be transferred between any two cells, the circuit configuration becomes complicated. It is necessary to provide a cell selection circuit capable of optionally selecting one of the plurality of cells, or to arrange a plurality of the above circuit configurations in series and transfer energy in a bucket brigade manner. In the former case, a number of wires and switches for configuring the cell selection circuit increases. In the latter case, a number of inductors increases according to the number of the cells connected in series.

Besides, in transferring the energy between two cells, variations at on and off timings of a plurality of corresponding switches have caused external short-circuiting of the cells or exceeding of withstand voltages of the switches.

The present invention has been made in view of these circumstances, and an object of the present invention is to provide a technique for safely achieving an energy transfer circuit using an inductor.

In order to address the above problem, an energy transfer circuit according to an aspect of the present invention including: an inductor; a cell selection circuit disposed between n (n is an integer of 2 or more) cells connected in series and the inductor, and capable of making electrically conductive between both ends of any cell of the n cells and both ends of the inductor; a clamp switch configured to form a closed loop including the inductor in a state where the cell selection circuit selects no cell; and a controller configured to control the cell selection circuit and the clamp switch. The cell selection circuit includes: first wiring connected with one end of the inductor; second wiring connected with the other end of the inductor; (n+1) first wiring side switches respectively connected between each node of the n cells connected in series and the first wiring; and (n+1) second wiring side switches respectively connected between each node of the n cells connected in series and the second wiring. The controller controls in an order of a first state of controlling the first wiring side switches and the second wiring side switches connected with nodes on both sides of a discharge cell to be discharged of the n cells to be in on state and the clamp switch to be in off state, a second state of controlling the first wiring side switches and the second wiring side switches connected with the nodes on the both sides of the discharge cell of the n cells to be in off state and the clamp switch to be in on state, and a third state of controlling the first wiring side switches and the second wiring side switches connected with nodes on both sides of a charge cell to be charged of the n cells to be in on state and the clamp switch to be in off state, and the clamp switch includes a diode connected or formed in parallel. The controller inserts a dead time between the first state and the second state, the dead time being for controlling the first wiring side switch and the second wiring side switch connected with the nodes on the both sides of the discharge cell to be in off state and the clamp switch to be in off state.

According to the present invention, an energy transfer circuit using an inductor can be safely achieved.

DESCRIPTION OF EMBODIMENTS

Figure 1:
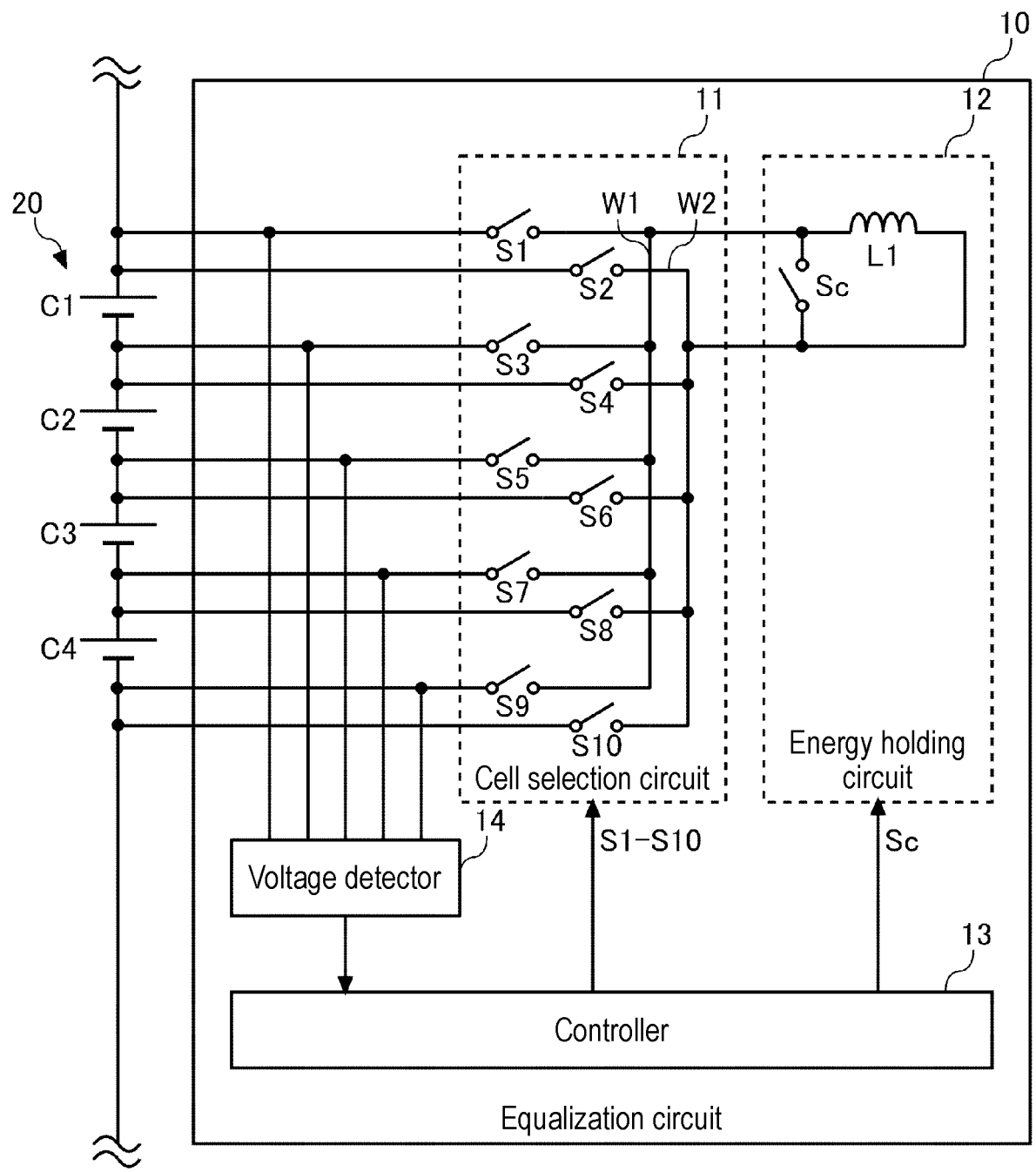
FIG. 1 is a diagram showing a configuration of a power storage system according to an exemplary embodiment of the present invention.

FIG. 1 is a diagram showing a configuration of power storage system 1 according to an exemplary embodiment of the present invention. Power storage system 1 includes equalization circuit 10 and power storage unit 20. Power storage unit 20 includes n (n is an integer of 2 or more) cells connected in series. FIG. 1 depicts an example in which four cells C1 to C4 are connected in series. A number of cells connected in series changes depending on the voltage specification demanded for power storage system 1.

For each cell, a chargeable/dischargeable power storage element such as a lithium ion battery cell, a nickel hydrogen battery cell, a lead battery cell, an electric double layer capacitor cell, or a lithium ion capacitor cell can be used. Hereinafter, in the present specification, it is assumed that an example that a lithium ion battery cell (nominal voltage: 3.6 V to 3.7 V) is used.

Equalization circuit 10 includes voltage detector 14, cell selection circuit 11, energy holding circuit 12, and controller 13. Voltage detector 14 detects the respective voltages of n (four in FIG. 1) cells connected in series. Specifically, voltage detector 14 is connected with respective nodes of the n cells connected in series by (n+1) voltage lines, and detects the respective voltages between two adjacent voltage lines, so as to detect the voltages of the respective cells. Voltage detector 14 can be configured by, for example, a general-purpose analog front-end integrated circuit (IC) or an application specific integrated circuit (ASIC). Voltage detector 14 converts the voltage of each cell that has been detected into a digital value, and outputs the digital value to controller 13.

Cell selection circuit 11 is provided between the n cells connected in series and inductor L1 included in energy holding circuit 12, and is a circuit capable of making electrically conductive between both ends of the cell selected from the n cells and both ends of inductor L1. Cell selection circuit 11 includes first wiring W1 connected with a first end of inductor L1, second wiring W2 connected with a second end of inductor L1, (n+1) first wiring side switches, and (n+1) second wiring side switches. The (n+1) first wiring side switches are respectively connected between each node of the n cells connected in series and first wiring W1. The (n+1) second wiring side switches are respectively connected between each node of the n cells connected in series and second wiring W2.

In the example shown in FIG. 1, n is four and a number of nodes is five. Cell selection circuit 11 includes five first wiring side switches and five second wiring side switches. In FIG. 1, first switch S1, third switch S3, fifth switch S5, seventh switch S7, and ninth switch S9 are the first wiring side switches, and second switch S2, fourth switch S4, and sixth switch S6, eighth switch S8, and tenth switch S10 are the second wiring side switches.

Energy holding circuit 12 includes inductor L1 and clamp switch Sc. Clamp switch Sc is a switch for making electrically conductive between both ends of inductor L1 in energy holding circuit 12. Energy holding circuit 12 is capable of forming a closed loop including inductor L1 in a state where cell selection circuit 11 does not select any cell. That is, when clamp switch Sc is controlled to be in on state, a closed loop including inductor L1 and clamp switch Sc is formed.

Controller 13 performs an equalization process between the n cells connected in series, based on the voltages of the n cells that have been detected by voltage detector 14. Controller 13 can be configured with, for example, a microcomputer. It is to be noted that controller 13 and voltage detector 14 may be integrated into one chip.

In the present exemplary embodiment, controller 13 performs an equalization process of the n cells connected in series in an active cell balance method. In the active cell balance method according to the present exemplary embodiment, energy is transferred from one cell (a cell to be discharged) to another cell (a cell to be charged) in the n cells connected in series, so as to equalize the capacities of one cell and another cell. By repeating such energy transfer, the capacities of the n cells connected in series are equalized.

First, controller 13 controls cell selection circuit 11 to make electrically conductive between both ends of the cell to be discharged in the n cells and both ends of inductor L1 for a predetermined time. In this state, a current flows from the cell to be discharged to inductor L1, and energy is stored in inductor L1.

Next, controller 13 controls cell selection circuit 11 to electrically cut off the n cells from inductor L1 and to turn on clamp switch Ss. In this state, a circulating current flows through the closed loop, and an inductor current is actively clamped in energy holding circuit 12.

Next, controller 13 turns off clamp switch Sc and controls cell selection circuit 11 to make electrically conductive between both ends of the cell to be charged in the n cells and both ends of inductor L1 for a predetermined time. In this state, the inductor current actively clamped in energy holding circuit 12 flows to the cell to be charged. As described above, the energy transfer from one cell to another cell is completed.

FIG. 2(a) to (h) show circuit diagrams for describing a basic operation sequence example of the equalization process of power storage system 1 according to the exemplary embodiment of the present invention. In the present basic operation sequence example, the number of cells connected in series is set to two to simplify the description. In the first state shown in FIG. 2(a), controller 13 controls first switch S1 and fourth switch S4 to be in on state, and controls second switch S2, third switch S3, fifth switch S5, sixth switch S6, and clamp switch Sc to be in off state. In this state, a current flows from first cell C1 to inductor L1, and energy that has been discharged from first cell C1 is stored in inductor L1.

Figure 2:
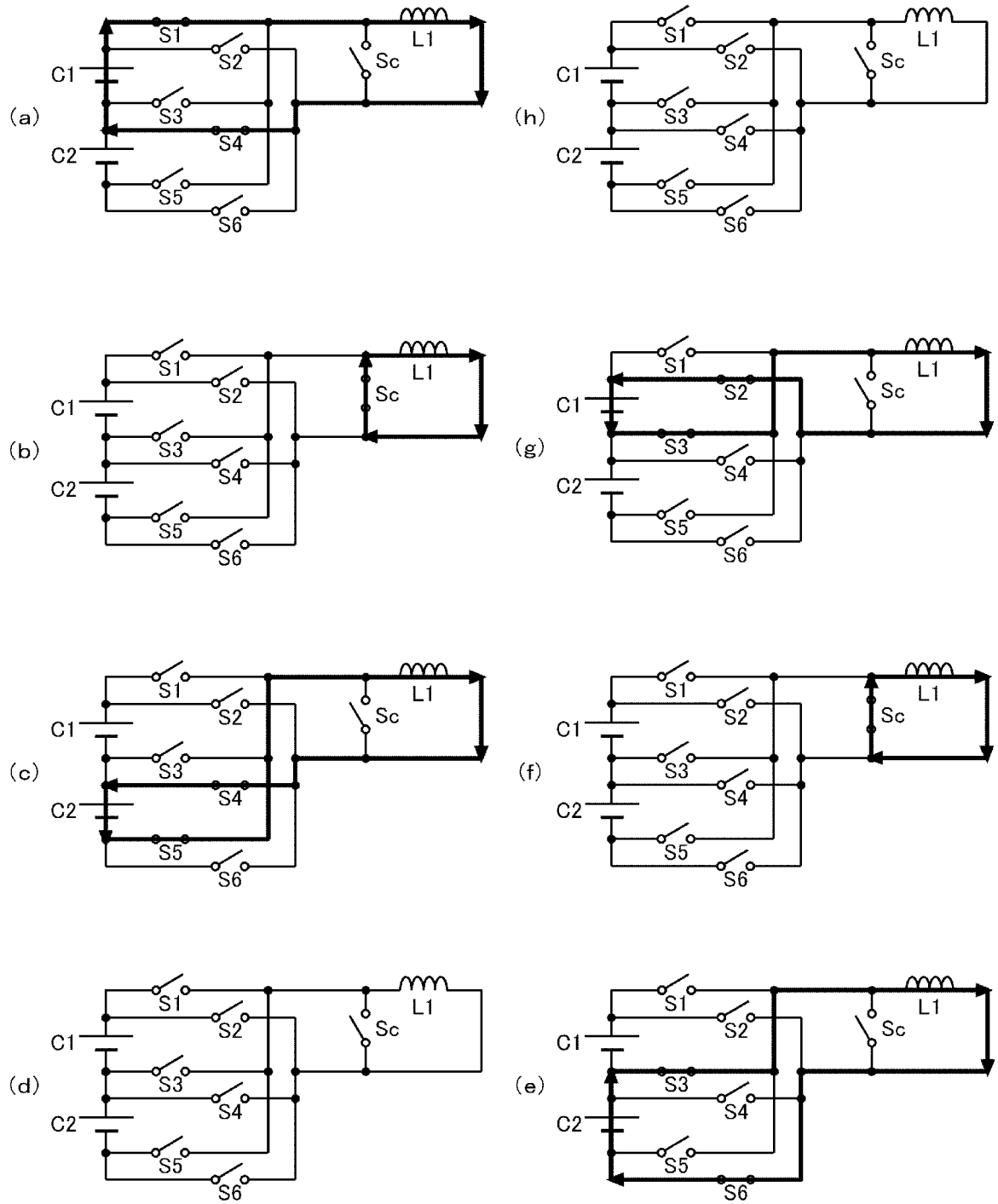
FIG. 2(a) to (h) shows circuit diagrams for describing a basic operation sequence example of an equalization process of the power storage system according to the exemplary embodiment of the present invention.

In the second state shown in FIG. 2(b), controller 13 controls clamp switch Sc to be in on state, and controls first switch S1, second switch S2, third switch S3, fourth switch S4, fifth switch S5, and sixth switch S6 to be in off state. In this state, the energy stored in inductor L1 flows as an inductor current in the closed loop, and is actively clamped.

In the third state shown in FIG. 2(c), controller 13 controls fourth switch S4 and fifth switch S5 to be in on state, and controls first switch S1, second switch S2, third switch S3, sixth switch S6, and clamp switch Sc to be in off state. In this state, the inductor current actively clamped in the closed loop flows to second cell C2, and second cell C2 is charged.

In the fourth state shown in FIG. 2(d), controller 13 controls first switch S1, second switch S2, third switch S3, fourth switch S4, fifth switch S5, sixth switch S6, and clamp switch Sc to be in off state. In this state, the energy transfer from first cell C1 to second cell C2 is completed.

In the fifth state shown in FIG. 2(e), controller 13 controls third switch S3 and sixth switch S6 to be in on state, and controls first switch S1, second switch S2, fourth switch S4, and fifth switch S5, and clamp switch Sc to be in off state. In this state, a current flows from second cell C2 to inductor L1, and the energy that has been discharged from second cell C2 is stored in inductor L1.

In the sixth state shown in FIG. 2(f), controller 13 controls clamp switch Sc to be in on state, and controls first switch S1, second switch S2, third switch S3, fourth switch S4, fifth switch S5, and sixth switch S6 to be in off state. In this state, the energy stored in inductor L1 flows as an inductor current in the closed loop, and is actively clamped.

In the seventh state shown in FIG. 2(g), controller 13 controls second switch S2 and third switch S3 to be in on state, and controls first switch S1, fourth switch S4, fifth switch S5, and sixth switch S6, and clamp switch Sc to be in off state. In this state, the inductor current actively clamped in the closed loop flows to first cell C1, and first cell C1 is discharged.

In the eighth state shown in FIG. 2(h), controller 13 controls first switch S1, second switch S2, third switch S3, fourth switch S4, fifth switch S5, sixth switch S6, and clamp switch Sc to be in off state. In this state, the energy transfer from second cell C2 to first cell C1 is completed.

In the second or sixth state, the inductor current is actively clamped in the closed loop, and the continuity of the inductor current is ensured. Accordingly, safe and reliable switching of the switches in cell selection circuit 11 is enabled.

Figure 3:
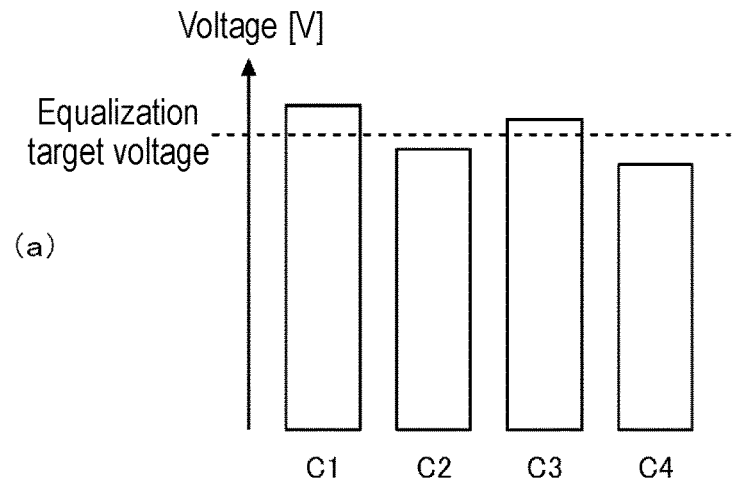
FIG. 3(a) to (c) shows diagrams for describing a specific example of the equalization process of the power storage system according to the exemplary embodiment of the present invention.
Figure 3:
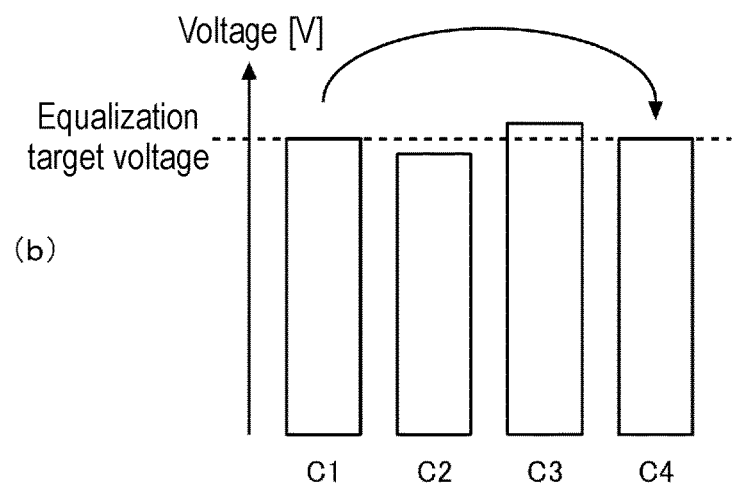
Figure 3:
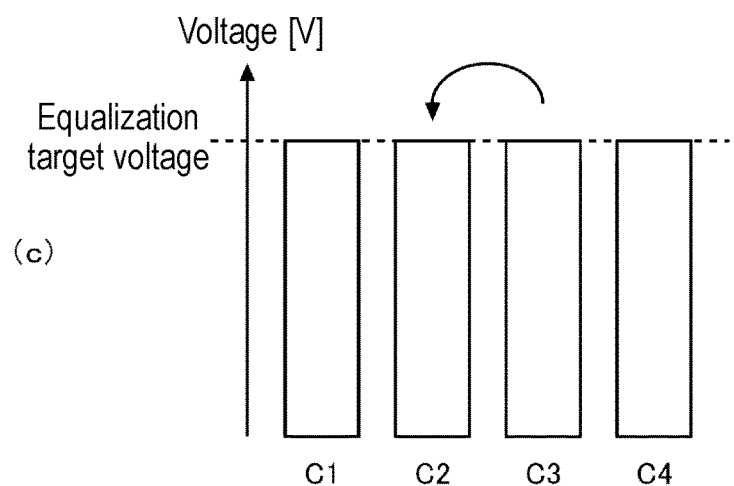

FIG. 3(a) to (c) show diagrams for describing a specific example of the equalization process of power storage system 1 according to the exemplary embodiment of the present invention. In the present specific example, it is assumed that four cells C1 to C4 are connected in series. FIG. 3(a) is a diagram schematically showing states of voltages of first cell C1 to fourth cell C4 before the start of the equalization process. Controller 13 calculates the average value of the voltages of first cell C1 to fourth cell C4 that have been detected by voltage detector 14, and sets the average value that has been calculated to an equalization target voltage (hereinafter, simply referred to as a target voltage).

Controller 13 transfers energy from a cell with a voltage higher than the target voltage to a cell with a voltage lower than the target voltage. For example, the energy is transferred from a cell with the highest voltage in the cells with the voltages higher than the target voltage (first cell C1 in FIG. 3(a)) to a cell with the lowest voltage in the cells lower than the target voltage (fourth cell in FIG. 3(a)).

Controller 13 determines an energy transfer amount within a range in which the voltage of a source cell (a cell to be discharged) is equal to or higher than the target voltage and the voltage of a destination cell (a cell to be charged) is equal to or lower than the target voltage. Controller 13 determines a discharge period of the source cell and a charge period of the destination cell, based on the energy transfer amount that has been determined and a discharge current and a charge current that are based on the design. The energy amount to be consumed while being actively clamped to energy holding circuit 12 is negligible. Therefore, the discharge period of the source cell and the charge period of the destination cell are basically the same with each other.

FIG. 3(b) shows a state in which the energy transfer from first cell C1, which is the source cell, to fourth cell C4, which is the destination cell, is completed. Controller 13 performs the above-described process again. Specifically, the energy is transferred from the cell with the highest voltage in the cells with the voltages higher than the target voltage (third cell C3 in FIG. 3(b)) to the cell with the lowest voltage in the cells with the voltages lower than the target voltage (second cell C2 in FIG. 3(b)).

FIG. 3(c) shows a state in which the energy transfer from the source cell, which is third cell C3, to the destination cell, which is second cell C2, is completed. As described above, the equalization process of first cell C1 to fourth cell C4 connected in series is completed.

In the specific example shown in FIG. 3(a) to (c), first, the average value of the voltages of a plurality of cells connected in series has been calculated, and then the target value has been set. In this respect, an algorithm that does not set a target value is also available. At each time point, controller 13 equalizes the voltages of the two cells by transferring the energy from the cell with the highest voltage to the cell with the lowest voltage among the voltages of the plurality of cells connected in series. Controller 13 repeatedly performs this process, until the voltages of the plurality of cells connected in series are all equalized.

Further, in the above specific example, the example of using the voltage as the equalization target value has been described. However, an actual capacity, a dischargeable capacity, or a rechargeable capacity may be used instead of the voltage.

By the way, variations in switching timings of the switches occur due to changes in threshold level caused by temperature changes of elements or drive circuits or variations in the manufacturing. Hence, it is difficult to control on and off of the plurality of switches and clamp switch Sc included in cell selection circuit 11 at ideal timings intended by the designer. Deviations of the switching timings of these switches may cause external short-circuiting in a discharge cell, when inductor L1 transitions from the excitation state to the active clamp state, and a selected switch and the clamp switch are simultaneously turned on. In addition, when the selected switch and the clamp switch are simultaneously turned off, a withstand voltage breakdown may occur in a switch on a discharging path. In a similar manner, a deviation in a switching timing may cause external short-circuiting in a charge cell, in transitioning from the active clamp state to a demagnetization state. In addition, a withstand voltage breakdown may occur in a switch on a charging path.

For example, in the basic operation sequence shown in FIG. 2(a) to (h), in transitioning from the excitation state of inductor L1 shown in FIG. 2(a) to the active clamp state shown in FIG. 2(b), external short-circuiting may occur in first cell C1, or a withstand voltage breakdown may occur in first switch S1 or fourth switch S4. In addition, in transitioning from the active clamp state shown in FIG. 2(b) to the demagnetization state shown in FIG. 2(c), external short-circuiting may occur in second cell C2, or a withstand voltage breakdown may occur in fourth switch S4 or fifth switch S5.

Figure 4:
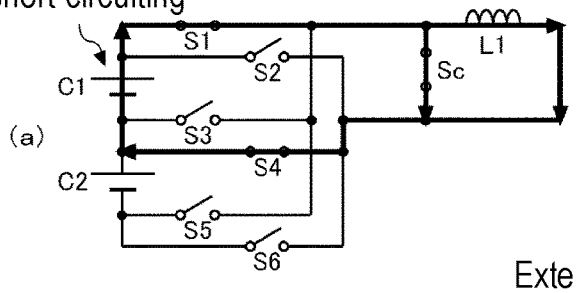
FIG. 4(a) to (d) shows diagrams showing an example of external short-circuiting and a withstand voltage breakdown of a switch.
Figure 4:
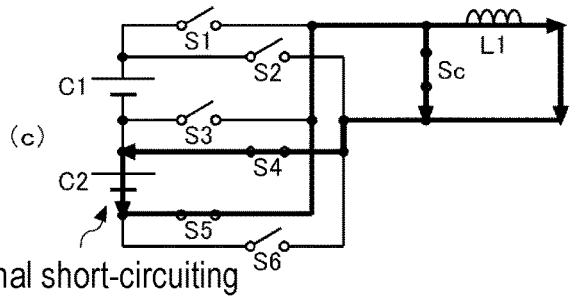
Figure 4:
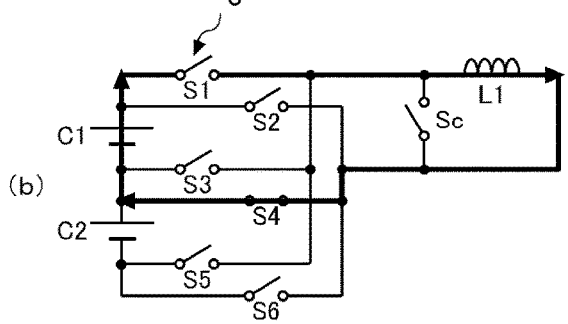
Figure 4:
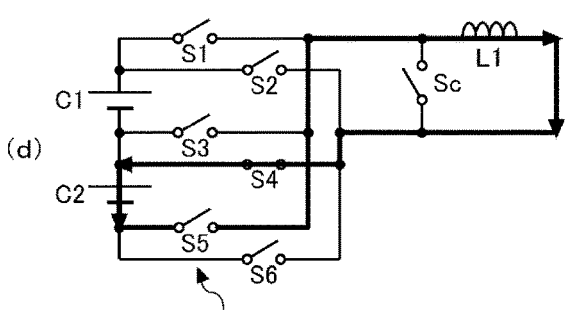

FIG. 4(a) to (d) show diagrams showing an example of external short-circuiting and a withstand voltage breakdown of a switch. FIG. 4(a) shows a state in which external short-circuiting occurs in first cell C1, in transitioning from the excitation state of inductor L1 shown in FIG. 2(a) to the active clamp state shown in FIG. 2(b). Once clamp switch Sc is turned on before first switch S1 and fourth switch S4 are turned off, the external short-circuiting occurs in first cell C1.

FIG. 4(b) shows a state in which a withstand voltage breakdown occurs in first switch S1, in transitioning from the excitation state of inductor L1 shown in FIG. 2(a) to the active clamp state shown in FIG. 2(b). In a case where turn off of first switch S1 is delayed with respect to turn off of fourth switch S4, the total voltage including the voltage between both ends of first cell C1 and the voltage between both ends of inductor L1 is applied as a high voltage to first switch S1. In a similar manner, in a case where turn off of fourth switch S4 is delayed with respect to turn off of first switch S1, the total voltage including the voltage between both ends of first cell C1 and the voltage between both ends of inductor L1 is applied as a high voltage to fourth switch S4.

FIG. 4(c) is a diagram showing a state in which external short-circuiting occurs in fourth cell C4, in transitioning from the active clamp state shown in FIG. 2(b) to the demagnetization state shown in FIG. 2(c). Once fourth switch S4 and fifth switch S5 are turned on before clamp switch Sc is turned off, external short-circuiting occurs in second cell C2.

FIG. 4(d) is a diagram showing a state in which a withstand voltage breakdown occurs in fifth switch S5, in transitioning from the active clamp state shown in FIG. 2(b) to the demagnetization state shown in FIG. 2(c). In a case where turn on of fifth switch S5 is delayed with respect to turn on of fourth switch S4, the total voltage including the voltage between both ends of second cell C2 and the voltage between both ends of inductor L1 is applied as a high voltage to fifth switch S5. In a similar manner, in a case where turn on of fourth switch S4 is delayed with respect to turn on of fifth switch S5, the total voltage including the voltage between both ends of second cell C2 and the voltage between both ends of inductor L1 is applied as a high voltage to fourth switch S4.

It is to be noted that it is conceivable to use switches with a high-withstand voltage respectively for first switch S1 to tenth switch S10. However, in such a case, the costs increase. Besides, the circuit area also increases.

Therefore, in the present exemplary embodiment, a dead time is inserted while inductor L1 is transitioning from the excitation state to the active clamp state, and in addition, a parallel diode of a switch is used in order to prevent a high voltage from generating during the dead time. In a similar manner, a dead time is inserted in transitioning from the active clamp state to the demagnetization state, and in addition, a parallel diode of a switch is used in order to prevent a high voltage from generating during the dead time.

Figure 5:
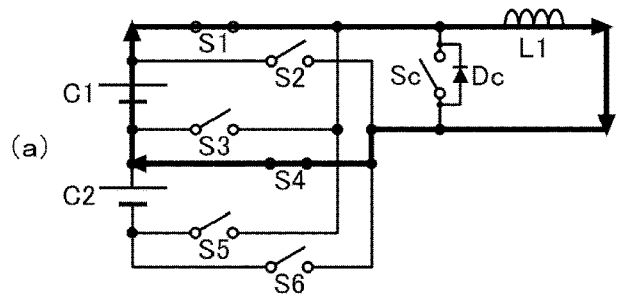
FIG. 5(a) to (c) shows circuit diagrams for describing an operation sequence while an inductor is transitioning from an excitation state to an active clamp state, in the equalization process of the power storage system according to the exemplary embodiment of the present invention.
Figure 5:
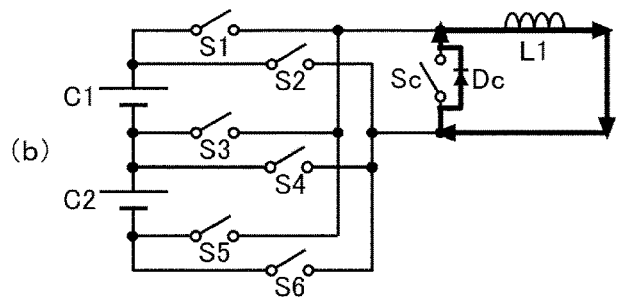
Figure 5:
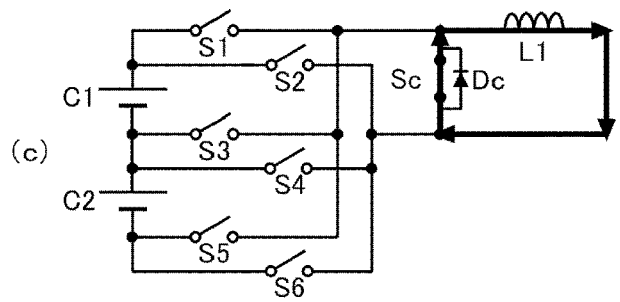
Figure 6:
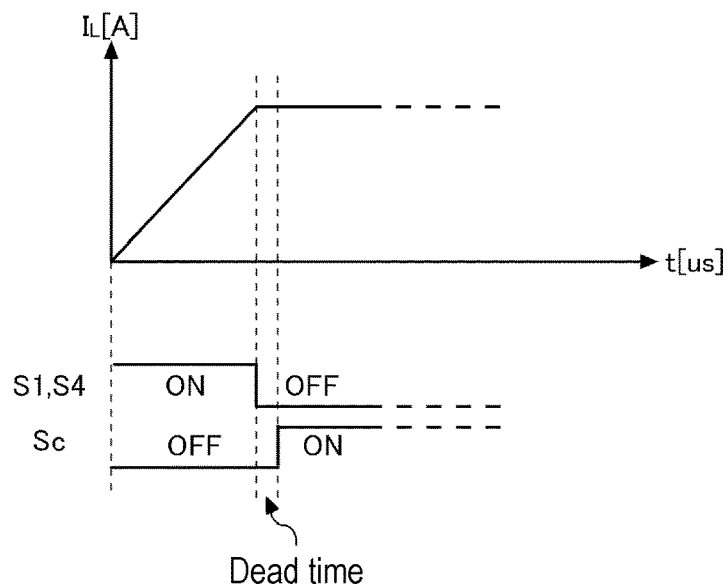
FIG. 6 is a timing diagram for describing the operation sequence while the inductor is transitioning from the excitation state to the active clamp state, in the equalization process of the power storage system according to the exemplary embodiment of the present invention.

FIG. 5(a) to (c) show circuit diagrams for describing an operation sequence while inductor L1 is transitioning from the excitation state to the active clamp state, in the equalization process of power storage system 1 according to the exemplary embodiment of the present invention. FIG. 6 is a timing diagram for describing an operation sequence while inductor L1 is transitioning from the excitation state to the active clamp state, in the equalization process of power storage system 1 according to the exemplary embodiment of the present invention.

In the examples shown in FIG. 5(a) to (c) and FIG. 6, clamp switch Sc includes body diode Dc. Body diode Dc is formed or connected in parallel with clamp switch Sc with the anode disposed on a side of second wiring W2 and the cathode disposed on a side of first wiring W1.

FIG. 5(a) shows the excitation state of inductor L1, and controller 13 controls first switch S1 and fourth switch S4 to be in on state, and controls clamp switch Sc and other switches to be in off state. FIG. 5(b) shows a dead time inserted between the excitation state and the active clamp state, and controller 13 turns off first switch S1, fourth switch S4, clamp switch Sc, and all the other switches. In this state, a circulating current flows across inductor L1 through body diode Dc of clamp switch Sc, and the current of inductor L1 is actively clamped.

FIG. 5(c) shows the active clamp state, and controller 13 controls first switch S1 and fourth switch S4 to be in off state, controls clamp switch Sc to be in on state, and controls the other switches to be in off state. In this state, a circulating current flows across inductor L1 through clamp switch Sc, and the current of inductor L1 is actively clamped.

The length of the dead time shown in FIG. 6 is determined based on variations in on and off timings of the plurality of switches and clamp switch Sc included in cell selection circuit 11. Specifically, the designer determines the length of the dead time while neither the above-mentioned external short-circuiting nor the withstand voltage breakdown occurs, based on the specifications of the switches to be used and/or the results of experiments and simulations. It is to be noted that during the dead time, a current flows across body diode Dc of clamp switch Sc. Accordingly, a loss according to forward voltage drop Vf of body diode Dc and the current amount occurs. Therefore, it is desirable to set the dead time as short as possible, the dead time serving as a period of time while neither the above-mentioned external short-circuiting nor the withstand voltage breakdown occurs.

It is effective to use a metal-oxide-semiconductor field-effect transistor (MOSFET), which has a relatively high switching speed, and the cost of which is relatively low for a plurality of switches and clamp switch Sc included in cell selection circuit 11. In an N-channel MOSFET, a parasitic diode (a body diode) is formed in a direction from the source to the drain. Therefore, in applications where there is a possibility that a current flows from both the source terminal and the drain terminal, it is common to connect two MOS-FETs in series in opposite directions to be used as a bidirectional switch.

Figure 7:
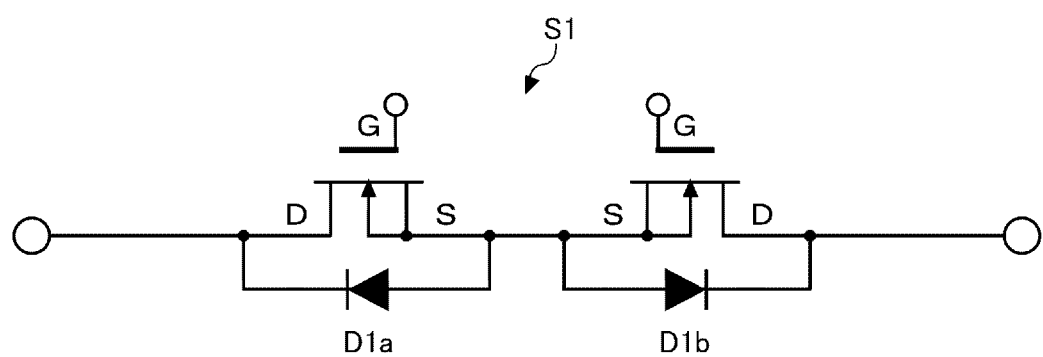
FIG. 7(a) to (b) shows diagrams showing an example of a circuit configuration in a case where a first switch is composed of two N-channel metal-oxide-semiconductor field-effect transistors (MOSFETs).
Figure 7:
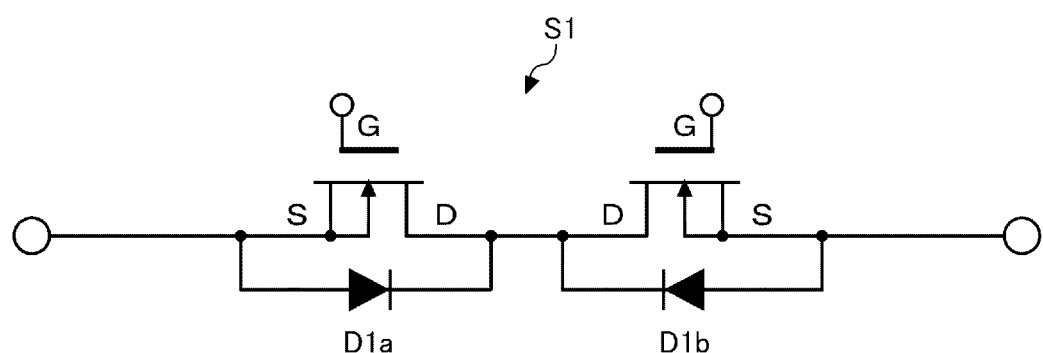

FIG. 7(a) to (b) show diagrams showing an example of a circuit configuration in a case where first switch S1 is composed of two N-channel MOSFETs. FIG. 7(a) shows an example of a configuration in which source terminals of the two N-channel MOSFETs are connected with each other to form a bidirectional switch. In this case, anodes of two body diodes D1a and D1b connected in series face each other. This configuration prevents a current from flowing between both ends of the bidirectional switch through the body diodes.

FIG. 7(b) shows an example of a configuration in which drain terminals of the two N-channel MOSFETs are connected with each other to form a bidirectional switch. In this case, cathodes of two body diodes D1a and D1b connected in series face each other. This configuration prevents a current from flowing between both ends of the bidirectional switch through the body diodes.

By comparing the configuration example of FIG. 7(a) and the configuration example of FIG. 7(b), the configuration example of FIG. 7(a) has a merit of sharing a power supply circuit (a DC/DC converter) of a gate driver of the two N-channel MOSFETs. In the configuration example shown in FIG. 7(a), the source potentials of the two N-channel MOSFETs are common, so that the power supply voltages of the two gate drivers can be shared. Therefore, the power supply circuit (the DC/DC converter) that supplies the power supply voltage to the two gate drivers can also be shared. This configuration enables reductions in the cost and the circuit area. On the other hand, in the configuration example shown in FIG. 7(b), the source potentials of the two N-channel MOSFETs cannot be shared. Therefore, it is necessary to separately provide power supply circuits (the DC/DC converters) that supply the power supply voltages to the two gate drivers. Hereinafter, a description will be given with regard to an example in which the bidirectional switch shown in the configuration example of FIG. 7(a) is used for first switch S1 to tenth switch S10 and clamp switch Sc.

Figure 9:
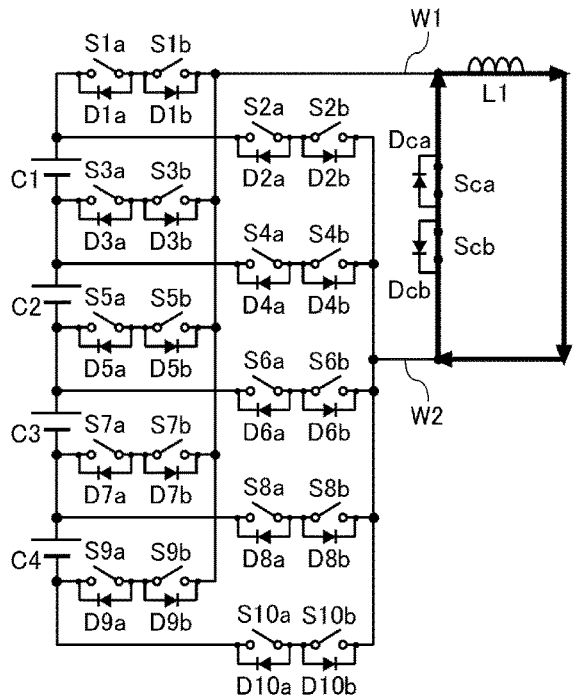
FIG. 9(a) to (d) shows circuit diagrams (No. 2) for describing the sequence of the energy transfer from the first cell to the third cell in the power storage system according to the exemplary embodiment of the present invention.
Figure 9:
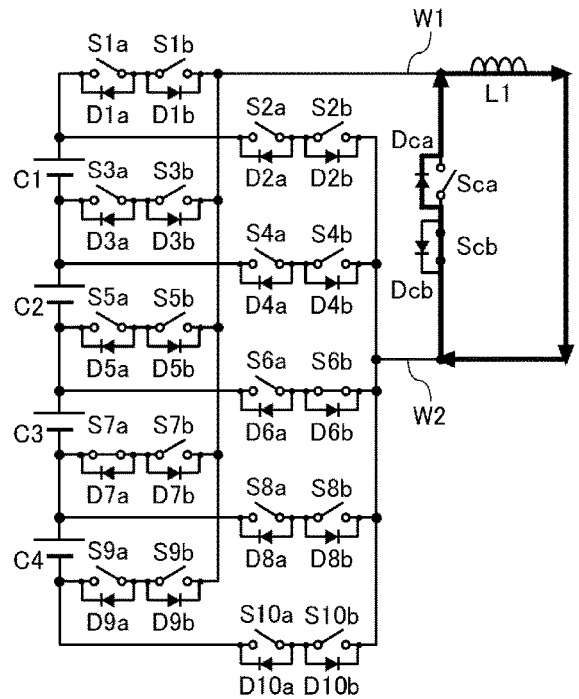
Figure 9:
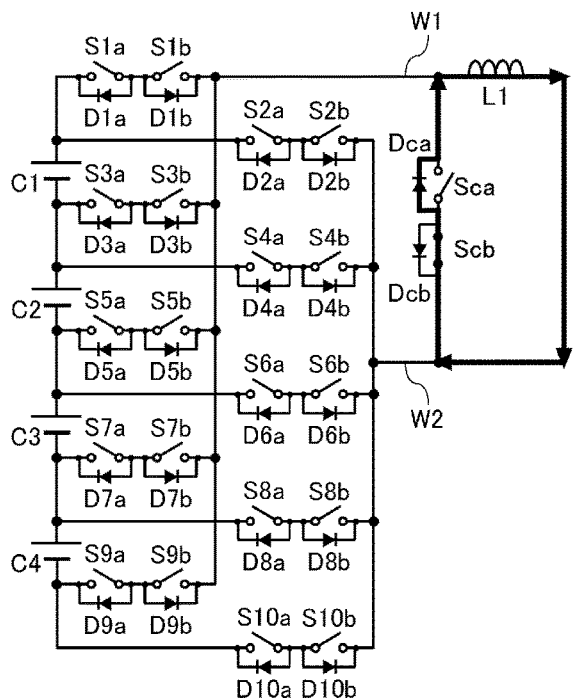
Figure 9:
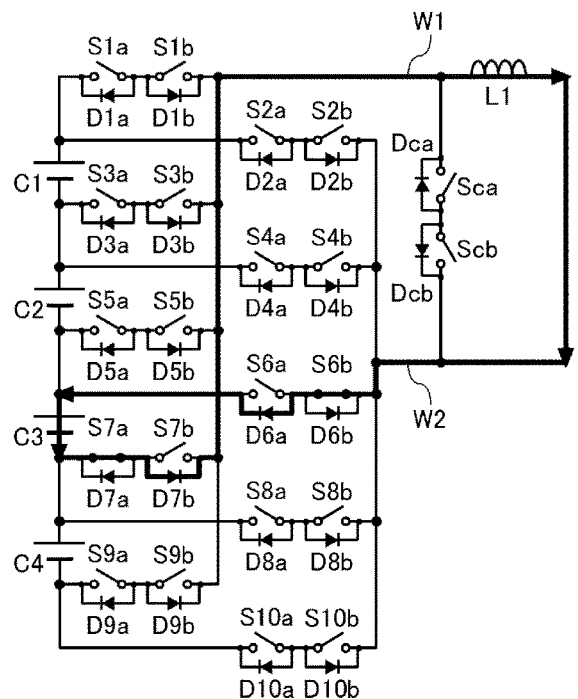
Figure 10:
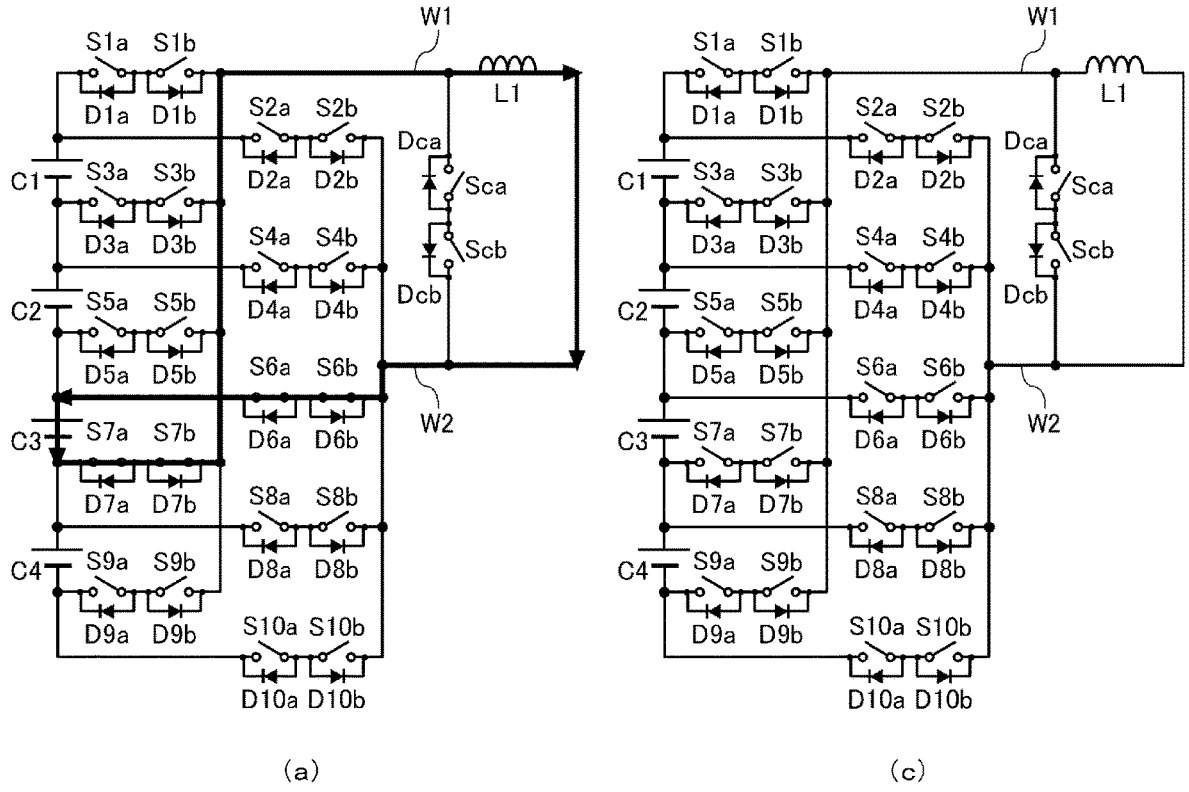
FIG. 10(a) to (c) shows circuit diagrams (No. 3) for describing the sequence of the energy transfer from the first cell to the third cell in the power storage system according to the exemplary embodiment of the present invention.
Figure 10:
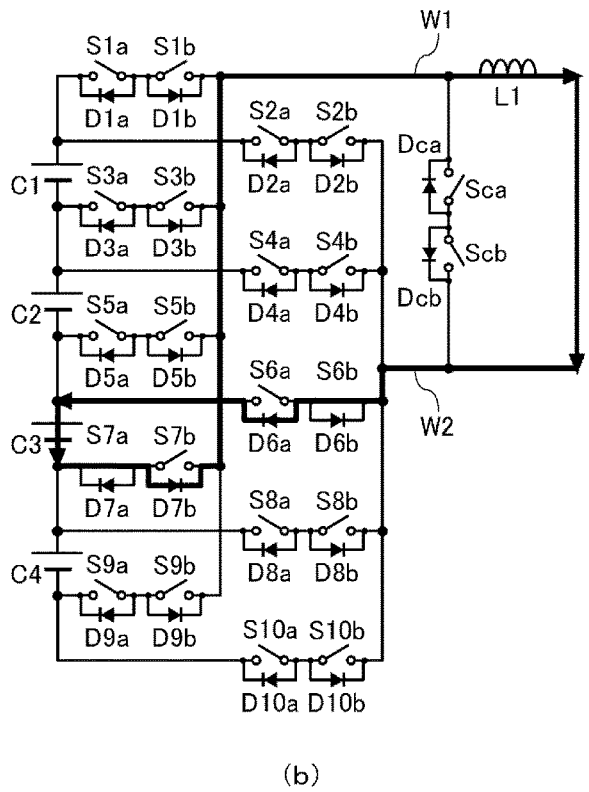
Figure 11:
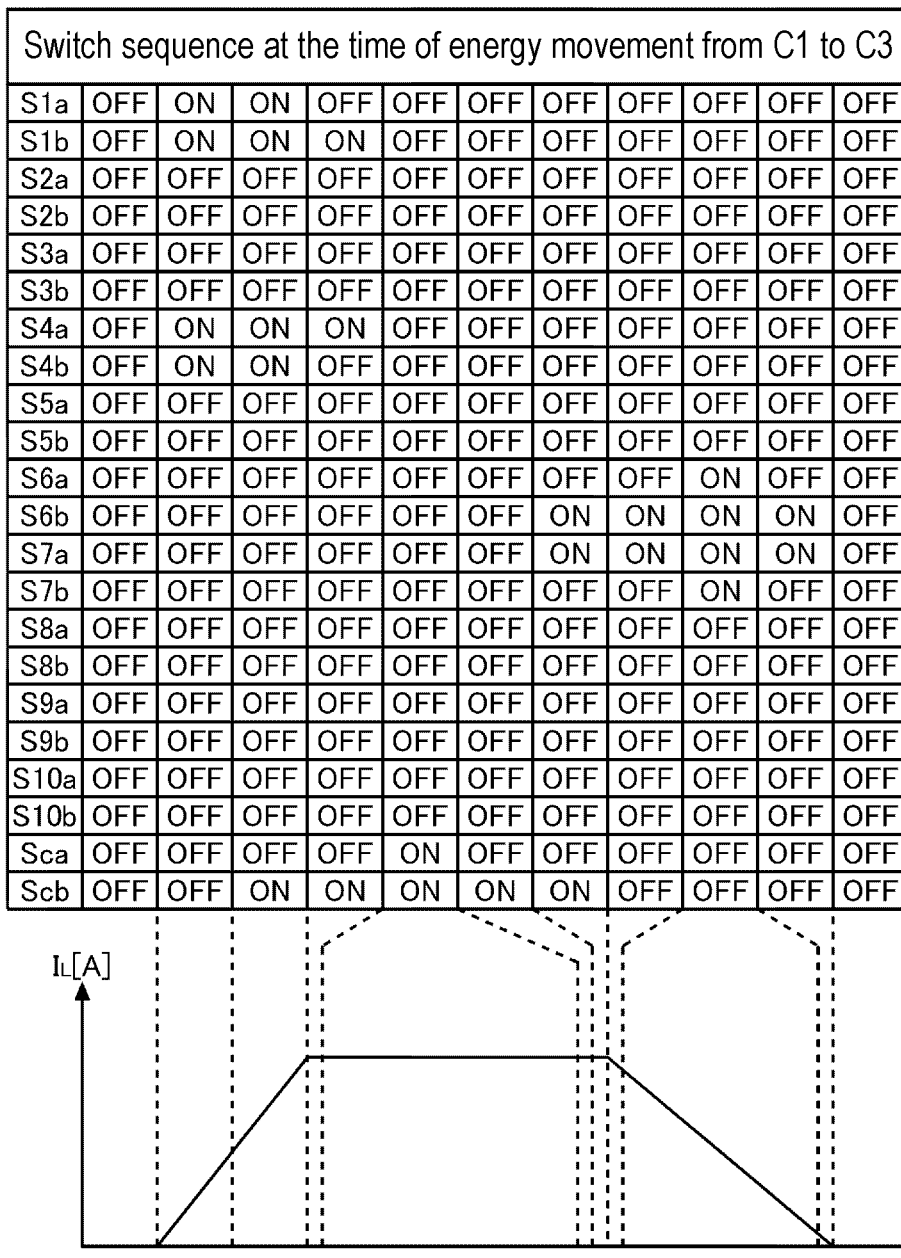
FIG. 11 is a diagram for summarizing a switch pattern for describing the sequence of the energy transfer from the first cell to the third cell in the power storage system according to the exemplary embodiment of the present invention.

FIG. 8(a) to (d) show circuit diagrams (No. 1) for describing a sequence of energy transfer from first cell C1 to third cell C3 in power storage system 1 according to the exemplary embodiment of the present invention. FIG. 9(a) to (d) show circuit diagrams (No. 2) for describing the sequence of the energy transfer from first cell C1 to third cell C3 in power storage system 1 according to the exemplary embodiment of the present invention. FIG. 10(a) to (c) show circuit diagrams (No. 3) for describing the sequence of the energy transfer from first cell C1 to third cell C3 in power storage system 1 according to the exemplary embodiment of the present invention. FIG. 11 is a diagram for summarizing a switch pattern for describing the sequence of the energy transfer from first cell C1 to third cell C3 in power storage system 1 according to the exemplary embodiment of the present invention. In the present operation example, the energy transfer from first cell C1 to third cell C3 is completed through 11 steps of the switch pattern.

Figure 8:
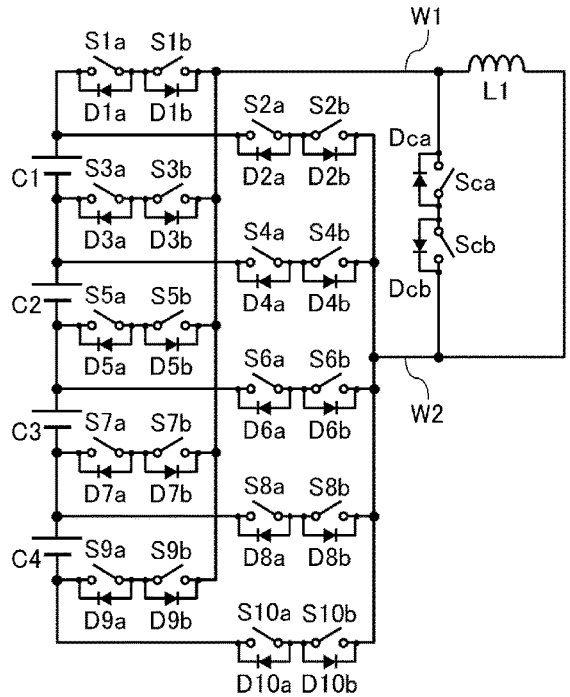
FIG. 8(a) to (d) shows circuit diagrams (No. 1) for describing a sequence of energy transfer from a first cell to a third cell in the power storage system according to the exemplary embodiment of the present invention.
Figure 8:
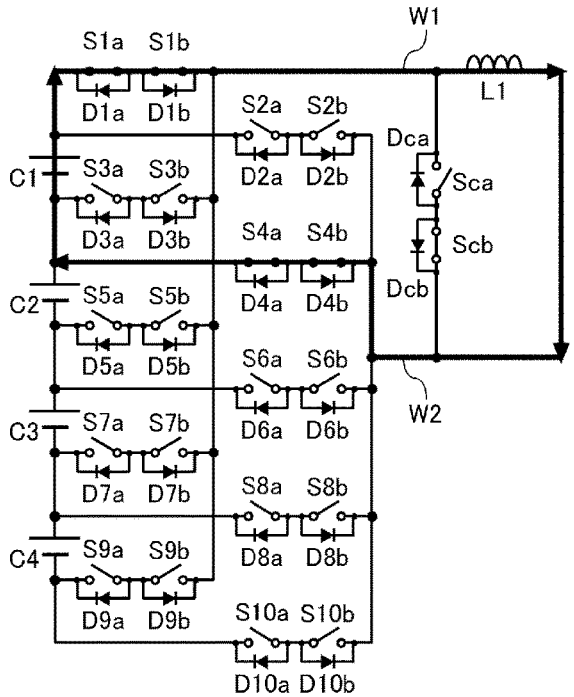
Figure 8:
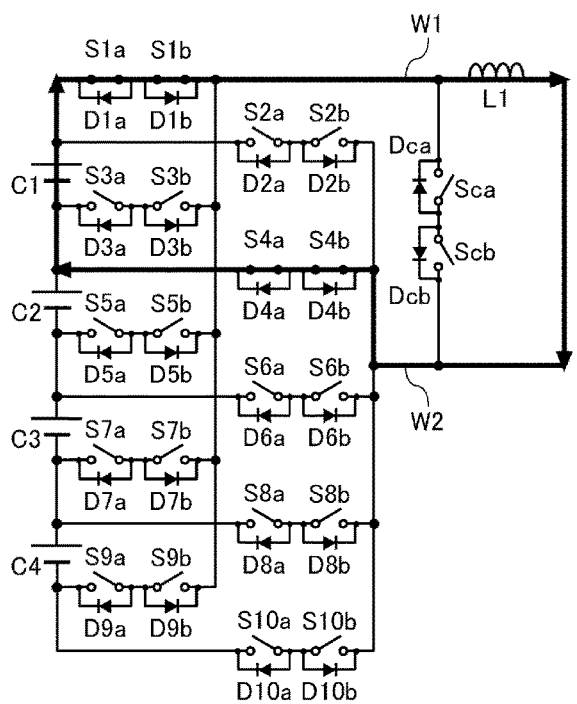
Figure 8:
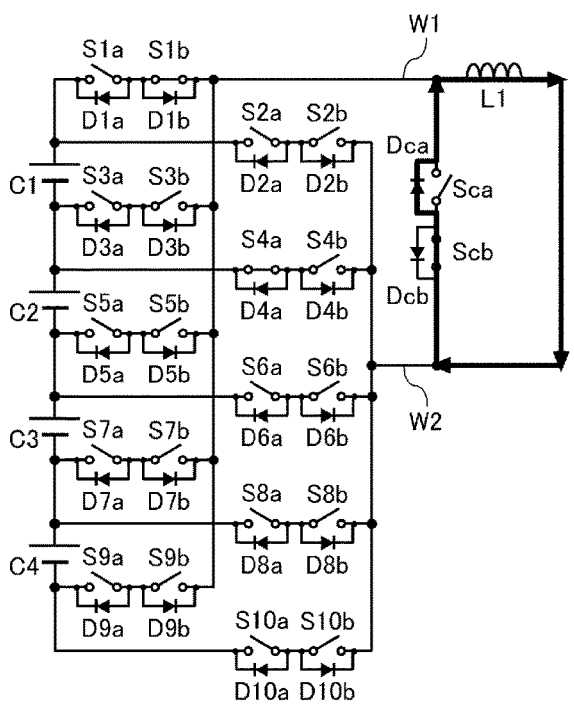

A first state shown in FIG. 8(a) is a state before discharging from first cell C1, and controller 13 controls all the switching elements to be in off state. Controller 13 turns on first-first switching element S1a, first-second switching element S1b, fourth-first switching element S4a, and fourth-second switching element S4b. Accordingly, the state transitions to a second state shown in FIG. 8(b). The second state is a state in which discharging starts from first cell C1 and inductor L1 is excited.

Next, controller 13 turns on second clamp switching element Scb. Accordingly, the state transits to a third state shown in FIG. 8(c). In the third state, a standby state is achieved while keeping a state in which inductor L1 is being excited after discharging starts from first cell C1, which is in the second state, both ends of inductor L1 are made to be electrically conductive through second clamp switching element Scb and body diode Dca of first clamp switching element Sca.

Next, controller 13 turns off first-first switching element S1a and fourth-second switching element S4b. At the timing when one of first-first switching element S1a or fourth-second switching element S4b is turned off, both ends of inductor L1 are electrically conductive through second clamp switching element Scb and body diode Dca of first clamp switching element Sca. That is, the electrical conduction between both ends of inductor L1 is not affected by deviations in timings of turning off first-first switching element S1a and fourth-second switching element S4b and turning on first clamp switching element Sca and second clamp switching element Scb. Both ends of inductor L1 are electrically conductive, and the state transitions to a fourth state shown in FIG. 8(d). In the fourth state, upon completion of discharging from first cell C1, a circulating current flows across inductor L1 through second clamp switching element Scb and body diode Dca of first clamp switching element Sca, and the current of inductor L1 is actively clamped.

Next, controller 13 turns off first-second switching element S1b and fourth-first switching element S4a, and turns on first clamp switching element Sca. Accordingly, the state transitions to a fifth state shown in FIG. 9(a). The fifth state is a state in which a circulating current flows across inductor L1 through second clamp switching element Scb and first clamp switching element Sca, and the current of inductor L1 is actively clamped. The voltage drop due to on-resistance of the switching element is smaller than forward voltage drop Vf of the body diode. Therefore, the active clamp state shown in FIG. 9(a) is smaller in loss than the active clamp state shown in FIG. 8(d).

Next, the controller 13 turns off first clamp switching element Sca. Accordingly, the state transitions to a sixth state shown in FIG. 9(b). The sixth state is a state in which a circulating current flows across inductor L1 through second clamp switching element Scb and body diode Dca of first clamp switching element Sca, and the current of inductor L1 is actively clamped.

Next, controller 13 turns on sixth-second switching element S6b and seventh-first switching element S7a. Accordingly, the state transitions to a seventh state shown in FIG. 9(c). In the seventh state, a standby state is achieved while keeping a state in which the current of inductor L1 is actively clamped, a current is made to flow from inductor L1 to third cell C3 through body diode D6a of sixth-first switching element S6a, sixth-second switching element S6b, seventh-first switching element S7a, and body diode D7b of seventh-second switching element S7b.

Next, controller 13 turns off second clamp switching element Scb. Accordingly, the state transitions to an eighth state shown in FIG. 9(d). In the eighth state, there is no path through second clamp switching element Scb and body diode Dca of first clamp switching element Sca, and a current flows from inductor L1 to third cell C3.

Next, controller 13 turns on sixth-first switching element S6a and seventh-second switching element S7b. Accordingly, the state transitions to a ninth state shown in FIG. 10(a). In the ninth state, the influence of forward voltage drop Vf of body diode D6a of sixth-first switching element S6a and body diode D7b of seventh-second switching element S7b is eliminated, a large current flows from inductor L1 to third cell C3, and inductor L1 is largely demagnetized.

Next, controller 13 turns off sixth-first switching element S6a and seventh-second switching element S7b. Accordingly, the state transitions to a tenth state shown in FIG. 10(b). In the tenth state, a current flows across body diode D6a of sixth-first switching element S6a and body diode D7b of seventh-second switching element S7b.

Next, controller 13 turns off sixth-second switching element S6b and seventh-first switching element S7a. Accordingly, the state transitions to an eleventh state shown in FIG. 10(c). The eleventh state is a state in which charging of third cell C3 is completed. By interposing the tenth state shown in FIG. 10(b) between the ninth state shown in FIG. 10(a) and the eleventh state shown in FIG. 10(c), inductor L1 and third cell C3 is cut off, when the current becomes 0. This configuration enables prevention of reverse excitation of inductor L1.

As described heretofore, according to the present exemplary embodiment, the switching element includes a body diode, and a dead time is inserted during the transition from the excitation state to the active clamp state of inductor L1, so that the excitation state can be transitioned to the active clamp state in a safe manner. For example, during the transition from the excitation state of FIG. 8(b) to the active clamp state of FIG. 9(a), second clamp switching element Scb is turned on to produce a state in which a path on which body diode Dca of first clamp switching element Sca is interposed between both ends of inductor L1 is formed. Even in a case where second clamp switching element Scb turns on, the presence of body diode Dca of first clamp switching element Sca does not lead to external short-circuiting of first cell C1. In this state, both ends of inductor L1 are electrically conductive, at a timing when one of first-first switching element S1a and fourth-second switching element S4b turns off. Therefore, even in a case where there is a difference between the turn-off timings of the both, the withstand voltage breakdown does not occur in first-first switching element S1a or fourth-second switching element S4b.

Further, the provision of a body diode in the switching element and insertion of a dead time while the active clamp state is transitioning to the demagnetization state enable safe transition from the active clamp state to the demagnetization state. For example, while the transition is occurring from the active clamp state shown in FIG. 9(a) to the demagnetization state shown in FIG. 10(a), a state is produced in which after turning on sixth-second switching element S6b and seventh-first switching element S7a, a path in which body diode D6a of sixth-first switching element S6a, sixth-second switching element S6b, seventh-first switching element S7a, and body diode D7b of seventh-second switching element S7b are interposed between inductor L1 and third cell C3 is formed. In this state, both first clamp switching element Sca and second clamp switching element Scb turn off and a state in which it becomes chargeable from inductor L1 to third cell C3. At such a timing, even in a case where one of sixth-second switching element S6b or seventh-first switching element S7a turns on, a high voltage is not generated between both ends of the switching element that does not turn on. Therefore, even in a case where there is a difference between the turn-on timings of the both, no withstand voltage breakdown occurs in sixth-second switching element S6b or seventh-first switching element S7a. In addition, sixth-first switching element S6a, sixth-second switching element S6b, seventh-first switching element S7a, seventh-second switching element S7b, first clamp switching element Sca, and second clamp switching element Scb are prevented from being turned on simultaneously. Therefore, no external short-circuiting occurs in third cell C3.

Heretofore, the present invention has been described, based on the exemplary embodiment. The exemplary embodiment is an example, and it is easily understood by those skilled in the art that various modifications are possible for each of these components and combinations of each processing process, and that such modifications are also within the scope of the present invention.

In the above-described exemplary embodiment, in order to transition from the active clamp state of FIG. 9(a) to the state in which the current flows from inductor L1 to third cell C3 in FIG. 9(d), after first clamp switching element Sca is turned off, sixth-second switching element S6b and seventh-first switching element S7a are turned on. However, in a reversed order, after sixth-second switching element S6b and seventh-first switching element S7a are turned on, first clamp switching element Sca may be turned off.

In the above-described exemplary embodiment, an example of using a MOSFET as a switching element has been described. In this regard, a semiconductor switching element, such as an insulated gate bipolar transistor (IGBT) in which a parasitic diode is not formed, may be used. In such a case, an external diode is connected in parallel to the semiconductor switching element, instead of the parasitic diode. By using a diode having lower forward voltage drop Vf, a loss in the dead time can be made smaller, so that the efficiency is improved.

Further, in the above-described exemplary embodiment, an example of equalizing a plurality of cells connected in series in the active method has been described. In this regard, use of the equalization circuit according to the exemplary embodiment enables equalization between a plurality of modules connected in series. The "cell" in the present specification may be appropriately read as a "module".

Figure 12:
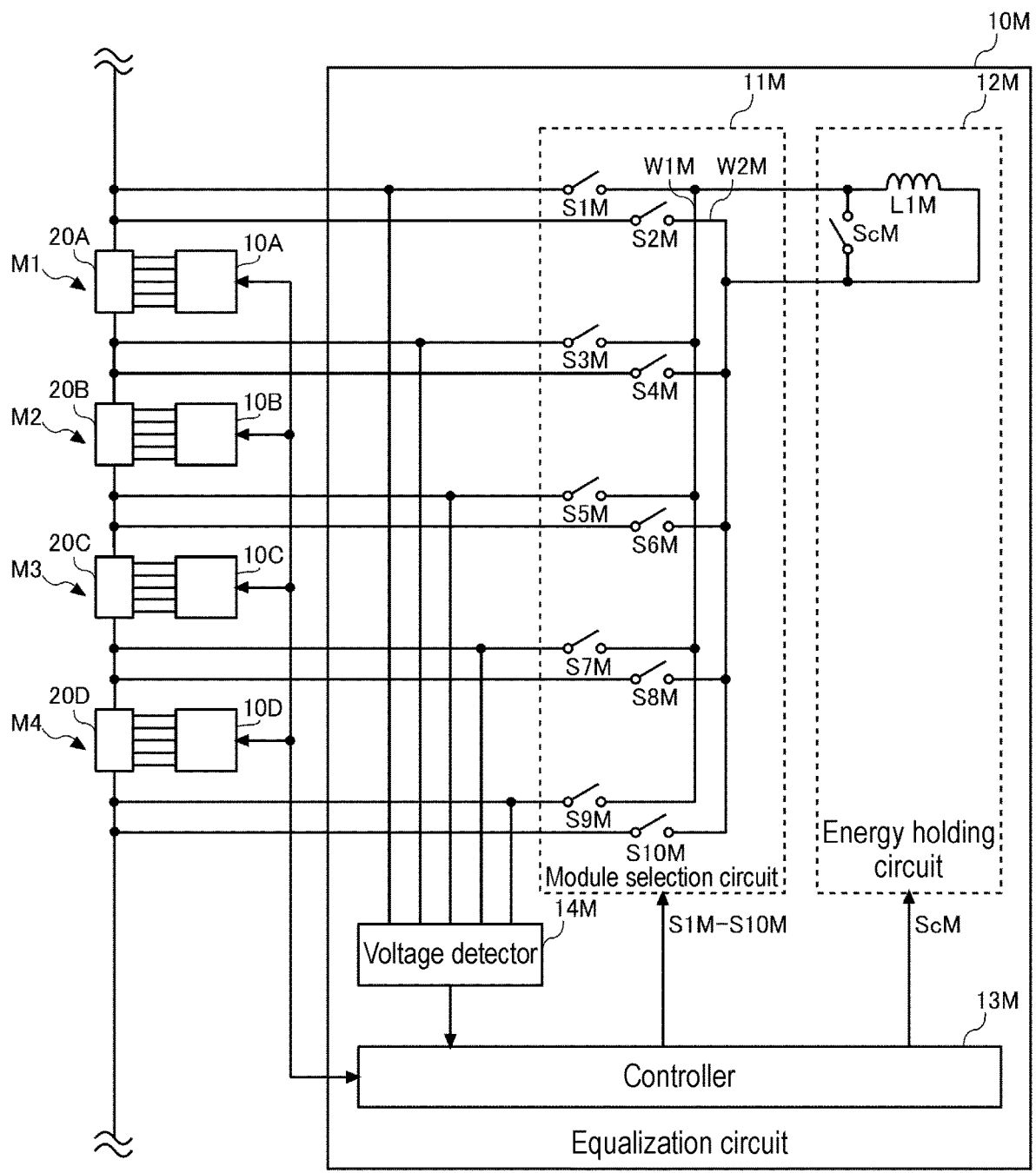
FIG. 12 is a diagram showing a configuration of a power storage system according to another exemplary embodiment of the present invention.

FIG. 12 is a diagram showing a configuration of a power storage system according to another exemplary embodiment of the present invention. FIG. 12 shows an exemplary embodiment of a power storage system including an equalization circuit that performs an equalization process on a plurality of modules connected in series. In FIG. 12, the plurality of modules each include a cell equalization circuit and a power storage unit in which a plurality of cells are connected in series, in the same manner as power storage system 1 shown in FIG. 1. First module M1 includes cell equalization circuit 10A and power storage unit 20A. Second module M2 includes cell equalization circuit 10B and power storage unit 20B. Third module M3 includes cell equalization circuit 10C and power storage unit 20C. Fourth module M4 includes cell equalization circuit 10D and power storage unit 20D.

Module equalization circuit 10M includes voltage detector 14M, module selection circuit 11M, energy holding circuit 12M, and controller 13M.

In the present exemplary embodiment, controller 13M performs an equalization process between m modules connected in series in an active module balance method. In the active module balance method according to the present exemplary embodiment, energy is transferred from one module (a module to be discharged) to another module (a module to be charged) between the m modules connected in series, so as to equalize the capacities of one module and the other module. By repeating such energy transfer, the capacities of the m modules connected in series are equalized.

Separately from the above equalization process between the plurality of modules, an equalization process between a plurality of cells connected in series in each module is performed. The equalization process between the plurality of cells connected in series in each module may be performed in a multiplex manner with the equalization process between the plurality of modules. In this case, module equalization circuit 10M and cell equalization circuits 10A to 10D are operated in cooperation with each other by communication. The equalization process between the modules is preferably performed with priority over the equalization process between the cells. After the equalization process between the modules is completed, the equalization process between the cells is completed. This configuration eliminates voltage differences between the respective cells that have been generated by performing the equalization process between the modules.

In addition, in the above-described exemplary embodiment, the equalization circuit in the active cell balance method has been described. However, it is applicable to energy transfer that does not intend the equalization between a plurality of cells or modules. For example, in a case where the temperatures largely differ between the two modules, at least a part of the energy of a module having a higher temperature may be transferred to a module having a lower temperature in order to reduce storage degradation.

In addition, the exemplary embodiments may be specified by the following items.

[Item 1]

Energy transfer circuit (10) including:

inductor (L1);

cell selection circuit (11) disposed between n, where n is an integer of 2 or more, cells (C1 to C4) connected in series and inductor (L1), and capable of making electrically conductive between both ends of any cell of n cells (C1 to C4) and both ends of inductor (L1);

clamp switch (Sc) configured to form a closed loop including inductor (L1) in a state where selection circuit (11) selects no cell (C1 to C4); and controller (13) configured to control cell selection circuit (11) and clamp switch (Sc), in which cell selection circuit (11) includes:

first wiring (W1) connected with one end of inductor (L1);

second wiring (W2) connected with the other end of inductor (L1);

(n+1) first wiling side switches (S1, S3, S5, S7, S9) respectively connected between each node of n cells (C1 to C4) connected in series and first wiring (W1); and (n+1) second wiring side switches (S2, S4, S6, S8, S10) respectively connected between each node of n cells (C1 to C4) connected in series and second wiring (W2), controller (13) controls in an order of a first state of controlling first wiring side switch (S1) and second wiring side switch (S4) connected with nodes on both sides of discharge cell (C1) to be discharged of n cells (C1 to C4) to be in on state and clamp switch (Sc) to be in off state, a second state of controlling first wiring side switch (S1) and second wiring side switch (S4) connected with the nodes on the both sides of discharge cell (C1) of n cells (C1 to C4) to be in off state and clamp switch (Sc) to be in on state, and a third state of controlling first wiring side switch (S7) and second wiring side switch (SG) connected with nodes on both sides of charge cell (C3) to be charged of n cells (C1 to C4) to be in on state and clamp switch (Sc) to be in off state, clamp switch (Sc) includes diode (Dc) connected or formed in parallel, and controller (13) inserts a dead time between the first state and the second state, the dead time being for controlling first wiring side switch (S1) and second wiring side switch (S4) connected with the nodes on the both sides of discharge cell (C1) to be in off state and clamp switch (Sc) to be in off state.

According to this configuration, energy transfer circuit (10) between the plurality of cells (C1 to C4) using inductor (L1) can be safely achieved.

[Item 2]

Energy transfer circuit (10) described in Item 1, in which (n+1) first wiring side switches (S1, S3, S5, S7, S9) each includes body diode (D1, D3, D5, D7, D9), (n+1) second wiring side switches (S2, S4, S6, S8, S10) each includes body diode (D2, D4, D6, D8, D10), and controller (13) inserts the dead time between the second state and the third state, the dead time being for controlling first wiring side switch (S7) and second wiring side switch (SG) connected with the nodes on the both sides of charge cell (C3) to be in off state, and clamp switch (Sc) to be in off state.

According to this configuration, energy transfer circuit (10) between the plurality of cells (C1 to C4) using inductor (L1) can be safely achieved.

[Item 3]

Energy transfer circuit (10) described in Item 1 or Item 2, in which clamp switch (Sc) is formed by connecting two switching elements (Sca, Scb), each having body diode (Dca, Dcb), in series in reverse directions, and in transitioning from the first state to the second state, controller (13) turns on switching element (Scb) having body diode (Dcb) disposed in a reverse direction with respect to a current direction, in clamp switch (Sc), and turns on switching element (Sca) having body diode (Dca) disposed in a forward direction with respect to the current direction after a predetermined time elapses.

According to this configuration, both ends of inductor (L1) can be electrically conductive during the dead time, and clamp switch (Sc) can be safely switched.

[Item 4]

Energy transfer circuit (10) described in Item 2, in which (n+1) first wiring side switches (S1, S3, S5, S7, S9) are formed by connecting two switching elements (S1a, S1b or S3a, S3b or S5a, S5b or S7a, S7b or S9a, S9b), each having body diode (D1a, D1b or D3a, D3b or D5a, D5b or D7a, D7b or D9a, D9b), in series in reverse directions, (n+1) second wiring side switches (S2, S4, S6, S8, S10) are formed by connecting two switching elements (S2a, S2b or S4a, S4b or S6a, S6b or S8a, S8b or S10a, S10b), each having body diode (D2a, D2b or D4a, D4b or D6a, D6b or D8a, D8b or D10a, D10b), in series in the reverse directions, and in transitioning from the second state to the third state, controller (13) turns on two switching elements (S7a, S6b) each having body diode (D7a, D6b) disposed in a reverse direction with respect to a current direction, out of first wiring side switch (S7) and second wiring side switch (S6) connected with the nodes on the both sides of charge cell (C3), and turns on two switching elements (S7b, S6a) each having body diode (D7b, D6a) disposed in a forward direction with respect to the current direction after a predetermined time elapses.

According to this configuration, inductor (L1) and charge cell (C3) can be electrically conductive through body diodes (D7b, D6a) during the dead time, and switches (S7, S6) can be safely switched.

[Item 5]

Energy transfer circuit (10) described in one of Item 1 to Item 4, further including voltage detector (14) configured to respectively detect voltages of n cells (C1 to C4), in which controller (13) performs an equalization process between n cells (C1 to C4), based on the voltages of n cells (C1 to C4) that have been detected by voltage detector (14).

According to this configuration, the equalization circuit using energy transfer is achieved.

[Item 6]

Energy transfer circuit (10) described in Item 5, in which controller (13) determines a target voltage or a target capacity of n cells (C1 to C4), based on the voltages of n cells (C1 to C4) that have been detected by voltage detector (14), and determines that a cell higher than the target voltage or the target capacity is the cell to be discharged, and determines that a cell lower than the target voltage or the target capacity is the cell to be charged.

According to this configuration, active cell balance can be achieved by energy transfer between cells (C1 to C4).

[Item 7]

Power storage system (1) including:

n, where n is an integer of 2 or more, cells (C1 to C4) connected in series; and energy transfer circuit (10) of any one of Item 1 to Item 6.

According to this configuration, power storage system (1) that safely achieves energy transfer circuit (10) using inductor (L1) can be constructed.

[Item 8]

Energy transfer circuit (10M) including:

inductor (L1M);

module selection circuit (11M) disposed between m, where m is an integer of 2 or more, modules (M1 to M4) connected in series and inductor (L1M), and capable of making electrically conductive between both ends of any module of m modules (M1 to M4) and both ends of inductor (L1M);

clamp switch (ScM) configured to form a closed loop including inductor (L1M) in a state where module selection circuit (11M) selects no module; and controller (13M) configured to control module selection circuit (11M) and clamp switch(ScM), in which module selection circuit (11M) includes:

first wiring (W1M) connected with one end of inductor (L1M);

second wiring (W2M) connected with the other end of inductor (L1M);

(m+1) first wiring side switches (S1M, S3M, S5M, S7M, S9M) respectively connected between each node of m modules (M1 to M4) connected in series and first wiring (W1M); and (m+1) second wiring side switches (S2M, S4M, S6M, S8M, S10M) respectively connected between each node of m modules (M1 to M4) connected in series and second wiring (W2), controller (13M) controls in an order of a first state of controlling first wiring side switch (S1M) and second wiring side switch (S4M) connected with nodes on both sides of discharge module (M1) to be discharged of m modules (M1 to M4) to be in on state and clamp switch (ScM) to be in off state, a second state of controlling first wiring side switch (S1M) and second wiring side switch (S4M) connected with the nodes on the both sides of discharge module (M1) to be in off state and clamp switch (ScM) to be in on state, and a third state of controlling first wiring side switch (S7M) and second wiring side switch (S6M) connected with nodes on both sides of charge module (M3) to be charged of m modules (M1 to M4) to be in on state and clamp switch (ScM) to be in off state, clamp switch (ScM) includes diode (Dc) connected or formed in parallel, and controller (13M) inserts a dead time between the first state and the second state, the dead time being for controlling first wiring side switch (S1M) and second wiring side switch (S4M) connected with the nodes on the both sides of discharge module (M1) to be in off state and clamp switch (ScM) to be in off state.

According to this configuration, energy transfer circuit (10M) between a plurality of modules (M1 to M4) using inductor (L1M) can be safely achieved.

[Item 9]

Energy transfer circuit (10M) described in Item 8, in which (m+1) first wiring side switches (S1M, S3M, S5M, S7M, S9M) each includes body diode (D1, D3, D5, D7, D9), (m+1) second wiring side switches (D2, D4, D6, D8, D10) each includes body diode (S2M, S4M, S6M, S8M, S10M), and controller (13) inserts the dead time between the second state and the third state, the dead time being for controlling first wiring side switch (S7M) and second wiring side switch (S6M) connected with the nodes on the both sides of charge module (M3) to be in off state, and clamp switch (ScM) to be in off state.

According to this configuration, energy transfer circuit (10M) between a plurality of modules (M1 to M4) using inductor (L1M) can be safely achieved.

[Item 10]

Energy transfer circuit (10M) described in Item 8 or Item 9, in which clamp switch (ScM) is formed by connecting two switching elements (Sca, Scb), each having body diode (Dca, Dcb), in series in reverse directions, and in transitioning from the first state to the second state, controller (13M) turns on switching element (Scb) having body diode (Dcb) disposed in a reverse direction with respect to a current direction in clamp switch (ScM), and turns on switching element (Sca) having body diode (Dca) disposed in a forward direction with respect to the current direction after a predetermined time elapses.

According to this configuration, both ends of inductor (L1M) can be electrically conductive during the dead time, and clamp switch (ScM) can be safely switched.

[Item 11]

Energy transfer circuit (10M) described in Item (10), in which (m+1) first wiring side switches (S1M, S3M, S5M, S7M, S9M) are formed by connecting two switching elements (S1a, S1b or S3a, S3b or S5a, S5b or S7a, S7b or S9a, S9b), each having body diode (D1a, D1b or D3a, D3b or D5a, D5b or D7a, D7b or D9a, D9b), in series in reverse directions, (m+1) second wiring side switches (S2M, S4M, S6M, S8M, S10M) are formed by connecting two switching elements (S2a, S2b or S4a, S4b or S6a, S6b or S8a, S8b or S10a, S10b), each having body diode (D2a, D2b or D4a, D4b or D6a, D6b or D8a, D8b or D10a, D10b), in series in the reverse directions, and in transitioning from the second state to the third state, controller (13M) turns on two switching elements (S7a, S6b) each having body diode (D7a, D6b) disposed in a reverse direction with respect to a current direction, out of first wiring side switch (S7M) and second wiring side switch (S6M) connected with the nodes on the both sides of charge module (M3), and turns on two switching elements (S7b, S6a) each having body diode (D7b, D6a) disposed in a forward direction with respect to the current direction after a predetermined time elapses.

According to this configuration, inductor (L 1M) and charge module (M3) can be electrically conductive through body diode (D7b, D6a) during the dead time, and switch (S7M, S6M) can be safely switched.

[Item 12]

Energy transfer circuit (10M) described in any one of Item 8 to Item 11, further including voltage detector (14M) configured to respectively detect voltages of m modules (M1 to M4), in which controller (13M) performs an equalization process between m modules (M1 to M4), based on the voltages of m modules (M1 to M4) that have been detected by voltage detector (14M).

According to this configuration, the equalization circuit using energy transfer is achieved.

[Item 13]

Energy transfer circuit (10M) described in Item 12, in which controller (13M) determines a target voltage or a target capacity of m modules (M1 to M4), based on the voltages of m modules (M1 to M4) that have been detected by voltage detector (14M), and determines that a module higher than the target voltage or the target capacity is the module to be discharged and determines that a module lower than the target voltages or the target capacity is the module to be charged.

According to this configuration, active module balance can be achieved by energy transfer between modules (M1 to M4).

[Item 14]

Energy transfer circuit (10M) described in Item 12, in which each of m modules (M1 to M4) includes:

a plurality of cells (C1 to C4) connected in series;

cell voltage detector (14) configured to respectively detect cell voltages of the plurality of cells (C1 to C4); and cell equalization circuit (10A to 10D) configured to equalize the cell voltages in identical module (M1 to M4), based on the cell voltages that have been detected by cell voltage detector (14), cell equalization circuit (10A to 10D) operates in cooperation with controller (13M) by communication, and performs an equalization process between the plurality of cells (C1 to C4), after the equalization process is performed on m modules (M1 to M4).

According to this configuration, the active module balance by energy transfer between modules (M1 to M4) and the active cell balance by energy transfer between cells (C1 to C4) are used together to efficiently equalize all cells.

[Item 15]

Power storage system (1M) including:

m, where m is an integer of 2 or more, modules (M1 to M4) connected in series; and energy transfer circuit (10M) of any one of Item 8 to Item 14.

According to this configuration, power storage system (1M) that safely achieves energy transfer circuit (10M) between a plurality of modules (M1 to M4) using inductor (L1M) can be constructed.

REFERENCE MARKS IN THE DRAWINGS

1: power storage system
10: equalization circuit
11: cell selection circuit
12: energy holding circuit
13: controller
14: voltage detector
20: power storage unit
C1: first cell
C2: second cell
C3: third cell
C4: fourth cell
L1: inductor
W1: first wiring
W2: second wiring
S1: first switch
S1a: first-first switching element
S1b: first-second switching element
S2: second switch
S2a: second-first switching element
S2b: second-second switching element
S3: third switch
S3a: third-first switching element
S3b: third-second switching element
S4: fourth switch
S4a: fourth-first switching element
S4b: fourth-second switching element
S5: fifth switch
S5a: fifth-first switching element
S5b: fifth-second switching element
S6: sixth switch
S6a: sixth-first switching element
S6b: sixth-second switching element
S7: seventh switch
S7a: seventh-first switching element
S7b: seventh-second switching element
S8: eighth switch
S8a: eighth-first switching element
S8b: eighth-second switching element
S9: ninth switch
S9a: ninth-first switching element
S9b: ninth-second switching element
S10: tenth switch
S10a: tenth-first switching element
S10b: tenth-second switching element
Sc: clamp switch
Sca: first clamp switching element
Scb: second clamp switching element D1a, D1b, D2a, D2b, D3a, D3b, D4a, D4b, D5a, D5b, D6a, D6b, D7a, D7b, D8a, D8b, D9a, D9b, D10b, D10a, Dc, Dca, Dcb: body diode

The invention claimed is:

1. An energy transfer circuit comprising:
an inductor;
a cell selection circuit disposed between n, where n is an integer of 2 or more, cells connected in series and the inductor, and capable of making electrically conductive between both ends of any cell of the n cells and both ends of the inductor;
a clamp switch configured to form a closed loop including the inductor in a state where the cell selection circuit selects no cell; and
a controller configured to control the cell selection circuit and the clamp switch, wherein
the cell selection circuit includes:
first wiring connected with one end of the inductor;
second wiring connected with another end of the inductor;
(n+1) first wiring side switches respectively connected between nodes of the n cells connected in series and the first wiring; and
(n+1) second wiring side switches respectively connected between nodes of the n cells connected in series and the second wiring,
the controller controls in an order of
a first state of controlling one of the (n+1) first wiring side switches and one of the (n+1) second wiring side switches to be in on state and the clamp switch to be in off state, the one of the (n+1) first wiring side switches and the one of the (n+1) second wiring side switches being connected with nodes on both sides of a discharge cell to be discharged of the n cells,
a second state of controlling the one the (n+1) first wiring side switches and the one of the (n+1) second wiring side switches to be in off state and the clamp switch to be in on state, the one the (n+1) first wiring side switches and the one of the (n+1) second wiring side switches being connected with the nodes on the both sides of the discharge cell of the n cells and
a third state of controlling one of the (n+1) first wiring side switches and one of the (n+1) second wiring side switches to be in on state and the clamp switch to be in off state, the one of the (n+1) first wiring side switches and the one of the (n+1) second wiring side switches being connected with nodes on both sides of a charge cell to be charged of the n cells,
the clamp switch includes a diode connected or formed in parallel, and
the controller inserts a dead time between the first state and the second state, the dead time being for controlling the one of the (n+1) first wiring side switches and the one of the (n+1) second wiring side switches to be in off state and the clamp switch to be in off state, the one of the (n+1) first wiring side switches and the one of the (n+1) second wiring side switches being connected with the nodes on the both sides of the discharge cell.

2. The energy transfer circuit according to claim 1, wherein
the (n+1) first wiring side switches each includes a body diode,
the (n+1) second wiring side switches each includes a body diode, and
the controller inserts a dead time between the second state and the third state, the dead time being for controlling the one of the (n+1) first wiring side switches and the one of the (n+1) second wiring side switches connected with the nodes on the both sides of the charge cell to be in off state, and the clamp switch to be in off state, the one of the (n+1) first wiring side switches and the one of the (n+1) second wiring side switches being connected with the nodes on the both sides of the charge cell.

3. The energy transfer circuit according to claim 2, wherein
the (n+1) first wiring side switches are each formed by connecting two switching elements, each having a body diode, in series oppositely,
the (n+1) second wiring side switches are each formed by connecting two switching elements, each having a body diode, in series oppositely, and
in transitioning from the second state to the third state, the controller turns on two switching elements each having a body diode disposed in a reverse direction with respect to a current direction, out of the one of the (n+1) first wiring side switches and the one of the (n+1) second wiring side switches, the one of the (n+1) first wiring side switches and the one of the (n +1) second wiring side switches being connected with the nodes on the both sides of the charge cell, and turns on two switching elements each having a body diode disposed in a forward direction with respect to the current direction after a predetermined time elapses.

4. The energy transfer circuit according to claim 1, wherein
the clamp switch is formed by connecting two switching elements, each having a body diode, in series oppositely, and
in transitioning from the first state to the second state, the controller turns on a switching element having the body diode disposed in a reverse direction with respect to a current direction, in the clamp switch, and turns on a switching element having the body diode disposed in a forward direction with respect to the current direction after a predetermined time elapses.

5. The energy transfer circuit according to claim 1, further comprising a voltage detector configured to respectively detect voltages of the n cells, wherein the controller performs an equalization process between the n cells, based on the voltages of the n cells detected by the voltage detector.

6. The energy transfer circuit according to claim 5, wherein the controller determines a target voltage or a target capacity of the n cells, based on the voltages of the n cells detected by the voltage detector, and determines that a cell higher than the target voltage or the target capacity is the cell to be discharged, and determines that a cell lower than the target voltage or the target capacity is the cell to be charged.

7. A power storage system comprising:
the energy transfer circuit of claim 1; and
the n, where n is an integer of 2 or more, cells connected in series.

8. An energy transfer circuit comprising:
an inductor;
a module selection circuit disposed between m, where m is an integer of 2 or more, modules connected in series and the inductor, and capable of making electrically conductive between both ends of any module of the m modules and both ends of the inductor;
a clamp switch configured to form a closed loop including the inductor in a state where the module selection circuit selects no module; and
a controller configured to control the module selection circuit and the clamp switch, wherein
the module selection circuit includes:

first wiring connected with one end of the inductor;
second wiring connected with another end of the inductor; and
(m+1) first wiring side switches respectively connected between nodes of the m modules connected in series and the first wiring; and
(m+1) second wiring side switches respectively connected between nodes of the m modules connected in series and the second wiring,
the controller controls in an order of
a first state of controlling one of the (m+1) first wiring side switches and one of the (m +1) second wiring side switches to be in on state and the clamp switch to be in off state, the (m +1) first wiring side switches and one of the (m+1) second wiring side switches being connected with nodes on both sides of a discharge module to be discharged of the m modules;
a second state of controlling the one of the (m+1) first wiring side switches and the one of the (m+1) second wiring side switches connected with the nodes on the both sides of the discharge module to be in off state and the clamp switch to be in on state, and
a third state of controlling the one of the (m+1) first wiring side switches and the one of the (m+1) second wiring side switches to be in on state and the clamp switch to be in off state, the one of the (m+1) first wiring side switches and the one of the (m+1) second wiring side switches connected with nodes on both sides of a charge module to be charged of the m modules,
the clamp switch includes a diode connected or formed in parallel, and
the controller inserts a dead time between the first state and the second state, the dead time being for controlling the one of the (m+1) first wiring side switches and the one of the (m +1) second wiring side switches connected with the nodes on the both sides of the discharge module to be in off state and the clamp switch to be in off state, the one of the (m+1) first wiring side switches and the one of the (m+1) second wiring side switches connected with the nodes on the both sides of the discharge module.

9. The energy transfer circuit according to claim 8, wherein
the (m+1) first wiring side switches each includes a body diode,
the (m+1) second wiring side switches each includes a body diode, and the controller inserts the dead time between the second state and the third state, the dead time being for controlling the one of the (m+1) first wiring side switches and the one of the (m+1) second wiring side switches to be in off state, and the clamp switch to be in off state, the one of the (m+1) first wiring side switches and the one of the (m+1) second wiring side switches being connected with the nodes on the both sides of the charge module.

10. The energy transfer circuit according to claim 9, wherein
the (m+1) first wiring side switches are each formed by connecting two switching elements, each having a body diode, in series oppositely,
the (m+1) second wiring side switches are each formed by connecting two switching elements, each having a body diode, in series oppositely, and
in transitioning from the second state to the third state, the controller turns on two switching elements each having a body diode disposed in a reverse directions with respect to a current direction, out of the one of the (m+1) first wiring side switches and the one of the (m+1) second wiring side switches, the one of the (m+1) first wiring side switches and the one of the (m+1) second wiring side switches being connected with the nodes on the both sides of the charge module, and turns on two switching elements each having a body diode disposed in a forward direction with respect to the current direction after a predetermined time elapses.

11. The energy transfer circuit according to claim 8, wherein
the clamp switch is formed by connecting two switching elements, each having a body diode, in series oppositely, and
in transitioning from the first state to the second state, the controller turns on the switching element having the body diode disposed in a reverse direction with respect to a current direction in the clamp switch, and turns on the switching element having the body diode disposed in a forward direction with respect to the current direction after a predetermined time elapses.

12. The energy transfer circuit according to claim 8, further comprising a voltage detector configured to respectively detect voltages of the m modules, wherein the controller performs an equalization process between the m modules, based on the voltages of the m modules detected by the voltage detector.

13. The energy transfer circuit according to claim 12, wherein the controller determines a target voltage or a target capacity of the m modules, based on the voltages of the m modules detected by the voltage detector, determines that a module higher than the target voltage or the target capacity is the module to be discharged, and determines that a module lower than the target voltage or the target capacity is the module to be charged.

14. The energy transfer circuit according to claim 12, wherein
each of the m modules comprises;
a plurality of cells connected in series;
a cell voltage detector configured to respectively detect cell voltages of the plurality of cells; and
a cell equalization circuit configured to equalize the cell voltages in an identical module, based on the cell voltages detected by the cell voltage detector, wherein the cell equalization circuit operates in cooperation with the controller by communication, and performs a cell equalization process between the plurality of cells, after the cell equalization process is performed on the m modules.

15. A power storage system comprising:
the energy transfer circuit of claim 8; and
the m, where m is an integer of 2 or more, modules connected in series.

* * * * *